United States Patent
Lyda

(10) Patent No.: US 9,290,367 B2
(45) Date of Patent: Mar. 22, 2016

(54) TISSUE ROLL-HANDLING CLAMP

(71) Applicant: Cascade Corporation, Fairview, OR (US)

(72) Inventor: Stephen P. Lyda, Portland, OR (US)

(73) Assignee: Cascade Corporation, Portland, OR (US)

( * ) Notice: Subject to any disclaimer, the term of this patent is extended or adjusted under 35 U.S.C. 154(b) by 247 days.

(21) Appl. No.: 13/919,897

(22) Filed: Jun. 17, 2013

(65) Prior Publication Data

US 2014/0369799 A1 Dec. 18, 2014

(51) Int. Cl.
| | | |
|---|---|---|
| *B66F 9/18* | (2006.01) | |
| *B66F 9/22* | (2006.01) | |
| *F16B 2/10* | (2006.01) | |
| *B66F 9/12* | (2006.01) | |

(52) U.S. Cl.
CPC .................. *B66F 9/184* (2013.01); *B66F 9/125* (2013.01); *B66F 9/18* (2013.01); *B66F 9/22* (2013.01); *F16B 2/10* (2013.01); *Y10S 414/124* (2013.01)

(58) Field of Classification Search
CPC .............. B66F 9/184; B66F 9/22; B66F 9/18; B66F 9/125; Y10S 414/124; F16B 2/10
USPC .................. 414/618, 620, 621, 640
See application file for complete search history.

(56) References Cited

U.S. PATENT DOCUMENTS

| | | | | |
|---|---|---|---|---|
| 2,603,368 | A | * | 7/1952 | Vance ............................ 414/620 |
| 2,645,372 | A | * | 7/1953 | Broersma ...................... 414/620 |
| 2,674,387 | A | * | 4/1954 | Ehmann ......................... 414/621 |
| 2,874,862 | A | * | 2/1959 | Farmer et al. ................. 414/620 |
| 3,172,693 | A | * | 3/1965 | Hansen .......................... 294/90 |
| 3,198,568 | A | * | 8/1965 | Mindrum ...................... 294/198 |
| 3,203,567 | A | * | 8/1965 | Huitfeldt ....................... 414/620 |
| 3,227,299 | A | * | 1/1966 | Draxler ......................... 414/621 |
| 3,407,951 | A | * | 10/1968 | Faust et al. .................... 414/621 |
| 3,438,523 | A | * | 4/1969 | Vik ............................... 414/420 |

(Continued)

FOREIGN PATENT DOCUMENTS

| | | | |
|---|---|---|---|
| DE | 890624 C | * | 9/1953 |
| WO | 01/98186 A1 | | 12/2001 |

OTHER PUBLICATIONS

PCT International Search Report, dated Dec. 30, 2013, International Patent Application No. PCT/US2013/056829, filed Aug. 27, 2013, Cascade Corporation, 2 pgs.

(Continued)

*Primary Examiner* — Terrell McKinnon
*Assistant Examiner* — Eret McNichols
(74) *Attorney, Agent, or Firm* — Chernoff Vilhauer McClung & Stenzel, LLP

(57) ABSTRACT

A tissue roll handling clamp, mountable on a vehicle such as a lift truck, has elongate, substantially equal-length, thin clamp arms with opposed tissue-engagement clamping surfaces. The clamp arms are capable of movement in unison by a frame assembly to alternative positions where the clamp arms extend longitudinally from the frame assembly selectively in either substantially horizontal or substantially vertical directions of extension. The frame assembly is capable of maintaining the respective clamping surfaces at substantially equal elevations to each other during such movement to substantially equalize the distribution of the weight of a clamped tissue roll between the opposed tissue-engagement clamping surfaces.

6 Claims, 5 Drawing Sheets

(56) References Cited

U.S. PATENT DOCUMENTS

| | | | | |
|---|---|---|---|---|
| 3,604,745 | A | * | 9/1971 | Sinclair .................. 294/197 |
| 3,896,957 | A | * | 7/1975 | Sinclair .................. 414/620 |
| 3,905,635 | A | * | 9/1975 | Esser .................... 294/198 |
| 4,177,000 | A | * | 12/1979 | Weinert et al. ............ 414/620 |
| 4,209,280 | A | * | 6/1980 | Bittner ................... 414/620 |
| 4,227,850 | A | * | 10/1980 | Farmer et al. ............. 414/620 |
| 4,435,119 | A | * | 3/1984 | House .................... 414/620 |
| 4,516,905 | A | | 5/1985 | Cavin et al. |
| 4,573,858 | A | * | 3/1986 | Sinclair .................. 414/620 |
| 4,664,576 | A | | 5/1987 | Coe |
| 4,718,816 | A | * | 1/1988 | King ..................... 414/739 |
| 4,742,468 | A | * | 5/1988 | Ohashi et al. .............. 701/50 |
| 5,020,963 | A | * | 6/1991 | Okada .................... 414/607 |
| 5,073,080 | A | * | 12/1991 | Blum ..................... 414/739 |
| 5,141,387 | A | * | 8/1992 | Smith .................... 414/735 |
| 5,292,219 | A | * | 3/1994 | Merin et al. ............... 414/621 |
| 5,366,339 | A | * | 11/1994 | Gould .................... 414/607 |
| 5,417,464 | A | * | 5/1995 | Seaberg et al. ............. 294/206 |
| 5,689,934 | A | | 11/1997 | Scherer et al. |
| 5,927,932 | A | * | 7/1999 | Seaberg .................. 414/620 |
| 6,431,816 | B1 | * | 8/2002 | Jordan et al. .............. 414/636 |
| 6,655,899 | B1 | * | 12/2003 | Emerson ................. 414/729 |
| 6,755,382 | B1 | | 6/2004 | Melnick |
| 7,018,159 | B2 | * | 3/2006 | Jordan et al. .............. 414/636 |
| 7,151,979 | B2 | * | 12/2006 | Andersen et al. ........... 700/214 |
| 2007/0065271 | A1 | * | 3/2007 | Merin et al. ............... 414/812 |
| 2009/0050413 | A1 | * | 2/2009 | Nilsson ................... 187/234 |
| 2010/0164243 | A1 | * | 7/2010 | Albin .................... 294/106 |
| 2011/0020605 | A1 | | 1/2011 | Suzuki et al. |
| 2012/0034059 | A1 | * | 2/2012 | Hedley et al. .............. 414/621 |
| 2014/0312639 | A1 | * | 10/2014 | Petronek ............... B66F 9/183 294/198 |
| 2015/0151576 | A1 | * | 6/2015 | Grengs |

OTHER PUBLICATIONS

Written Opinion of the International Searching Authority, dated Dec. 30, 2013, International Patent Application No. PCT/US2013/056829, filed Aug. 27, 2013, Cascade Corporation, 5 pgs.

* cited by examiner

TISSUE ROLL-HANDLING CLAMP

CROSS-REFERENCE TO RELATED APPLICATIONS

None.

BACKGROUND OF THE INVENTION

This disclosure relates to improvements in tissue roll-handling clamps normally mounted on lift trucks or other industrial vehicles for clamping and manipulating large cylindrical rolls of tissue, such as soft facial or toilet tissue, soft toweling tissue, or industrial toweling tissue having relatively low densities ranging generally from about 0.0056 to about 0.015 pounds per cubic inch. Such relatively low-density tissue rolls are much softer and more fragile than rolls of denser, tougher and stronger paper used for printing, packaging, construction and the like which are also clamped and manipulated by roll-handling clamps. In particular, the outwardly curved surfaces of the low-density tissue rolls tend to be deformed inwardly, to a much higher degree than is the case with higher density paper rolls, by the opposed roll-engaging clamping surfaces of a roll-handling clamp when being clamped and manipulated in loading, transporting, warehousing and manufacturing environments. Such extreme deformations can cause significant pressure concentrations on the surfaces of the tissue rolls, leading to rupturing of the surfaces with resultant expensive loss of tissue material, and/or radial unbalancing of the tissue rolls rendering them unusable at the desired high rotational speeds of the production equipment with which they are intended to be used.

The foregoing damaging deformations of tissue rolls by roll-handling clamps have been partially reduced in the past by the use of special tissue-handling clamp pads having generally larger clamping areas than the clamp pads used for higher density paper rolls. Such tissue-handling clamp pads usually also have either convexly, or shallowly concavely, curved tissue-engagement clamping surfaces which gradually, rather than abruptly, deform the outward curvature of the tissue roll surfaces over at least a major portion of the clamping surface area during clamping engagement, and/or have peripheral clamping areas which recede gradually outwardly and backwards from a major portion of the clamping surface area. However, the foregoing damaging types of deformations of tissue rolls have persisted despite these attempted solutions because no one has previously attributed the damage to other possible causes, and particularly not to factors involving the relative distribution of the weight of the tissue roll between the opposing tissue-engagement clamping surfaces.

Tissue-handling roll clamps have in the past been of the type having the above-described tissue-engagement clamping surfaces extending unequally, by means of respective elongate clamp arms of unequal lengths, from a frame assembly mountable on a lift truck carriage. The unequal-length clamp arm arrangement has been highly preferred to pick up or deposit tissue rolls supported vertically upon, or horizontally in near proximity to, other surfaces by providing a short arm which can engage one side of the roll in a position extending short of the roll's maximum width, and an opposing long arm which can engage the opposite side of the roll in a position extending preferably beyond the roll's maximum width so as to clamp the roll at least approximately diametrically. This previous arrangement is exemplified by FIG. 1 showing alternative tissue rolls 10 or 12 of different respective diameters A or B, both in a horizontal-axis, or "bilge," position engaged by a short arm 14 and a long arm 16, each arm having a respective tissue-engagement clamping surface 14a, 16a of the type described above. The clamp arms 14 and 16 are usually pivotally mounted on a frame assembly 22 by respective pivot pins such as 14b and 16b to enable opening and closing of the clamp arms by hydraulic cylinders (not shown), but in some cases the clamp arms have been slidably movable toward and away from each other to enable opening and closing.

If the tissue rolls are also expected to be handled with their axes extending vertically, the frame assembly 22 has been equipped with a worm-driving rotator motor such as 24 which can selectively rotate the frame assembly 22, and thus the clamp arms 14 and 16, about a forwardly-extending axis of rotation 26 to positions where they are spaced horizontally for picking up or depositing a vertically oriented tissue roll 12 as shown in FIG. 2. Or, as a still further alternative, the frame assembly has sometimes been equipped with a forwardly-rotating upender which can selectively pivot the frame assembly 22 forwardly 90 degrees, by extension of hydraulic cylinders such as 28, to permit the clamp arms to pick up or deposit a horizontal paper roll 12 from above as exemplified by FIG. 3. In such case, the rotator 24 has also been usable to rotate the clamp arms and the roll horizontally about the now vertically extending axis 26 shown in FIG. 3.

Unequal-length clamp arm arrangements have encountered certain problems in their attempts to handle tissue rolls because the low-density softness of tissue rolls creates an exceptionally large flat deformation in the bottom of a tissue roll when in the "bilge" position, such deformation being indicated as 25 schematically in FIG. 1A. As the flat deformation 28 of a tissue roll becomes larger, the lower clamp arm 14 must become shorter and the upper clamp arm 16 must become longer in order to clamp the roll 12 substantially diametrically in the "bilge" position as shown schematically in FIG. 1A. This means that the longer upper clamp arm 16 must now reach around the roll further to clamp it on the roll's diameter D. Because of this the upper clamp arm 16 must open significantly further to clear the roll at the "clearance" position 16' indicated in FIG. 1A when approaching the roll, which limits the diameter of the largest tissue roll which can be engaged by the clamp. Trying to minimize this problem would require difficult simultaneous multi-function maneuvering of the lift truck's mast during the approach to the roll, which would increase the risk of roll damage. Additionally, when the roll is in a vertical position, the longer clamp arm is also more difficult to position so that it reaches around the roll, and this problem is especially severe if it is desired to clamp small diameter rolls, thereby making it difficult for the same clamp to be used to clamp both large diameter and small diameter rolls.

Equal-length clamp arm arrangements have been used in the past, instead of the foregoing unequal-length arm arrangements, for the handling of high-density paper rolls. However such equal-arm arrangements have not previously been used for tissue rolls for various reasons resulting from the low density of tissue rolls. For example, for equal-length clamp arm arrangements, the absence of a lower short arm 14 would make handling of tissue rolls in the horizontal "bilge" configuration, as described above, susceptible to increasing roll damage as the flat deformation 25 of the tissue roll becomes larger. This is because the equal-length lower clamp arm would be required to forcibly insert itself into the area, between the flat deformation 25 of the roll and the supporting floor, to reach a substantially vertically oriented clamping roll diameter between the upper clamping surface and the lower clamping surface of an equal-length clamp arm arrangement.

The resultant risk of unacceptable damage caused by such a forcible insertion of the lower clamp arm would be high in the case of a low-density tissue roll.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
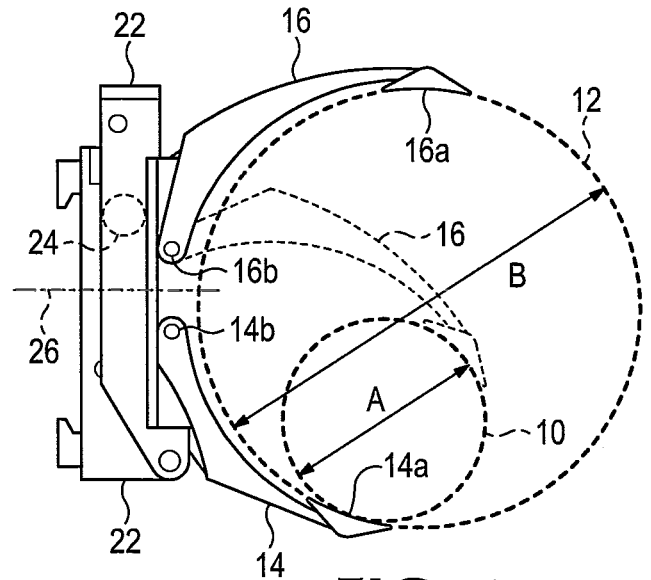
FIGS. 1-3 are simplified schematic drawings of a prior art tissue roll clamp clamping a roll in different orientations.
Figure 1A:
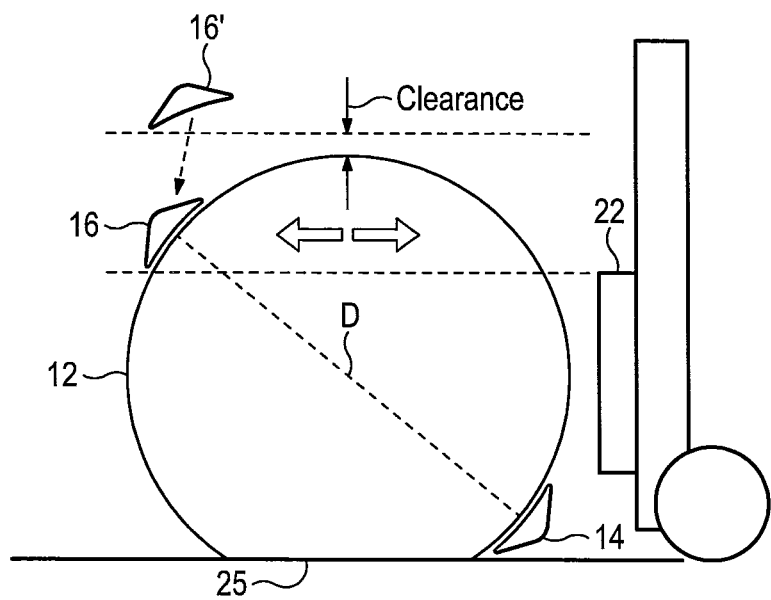
FIG. 1A is a schematic diagram of a horizontal tissue roll in the "bilge" position.

The applicant herein has discovered that a significant cause of the persistant damage to tissue rolls, when using the conventional unequal-arm approach employing respective long and short opposing clamp arms to engage and manipulate the roll, is the result of an unequal distribution of the tissue-roll's weight between the long and short clamp arms. With reference to FIG. 1, it can be seen that, although the clamping force is equal between the opposed tissue-engagement clamping surfaces 14a and 16a, the entire weight of the load is added to the force on the lower of the two clamping surfaces, i.e. the short arm clamping surface 14a, significantly adding to the tissue roll's deformation at the surface 14a and encouraging rupture of the tissue at that location to a much greater extent than at the upper clamping surface 16a. The unequal effect would be reversed if the rotator 24 were to invert the clamp. The unequal effect would disappear if the clamp were rotated to the position shown in FIG. 2 because the clamping surfaces 14a and 16a would be at equal elevations, thereby sharing the weight of the cylindrical tissue roll substantially equally by a combination of frictional and shear resistance. However the unequal effect would reappear in the upended position of the clamp as shown in FIG. 3, this time in reverse with the majority of the load's weight being supported on the long-arm's lower clamping surface 16a.

It did not previously appear that this unequal effect should contribute significantly to tissue roll damage because the problem is transient, depending on the temporary changeable orientation of the clamp. However the discovery of the nature of the problem now requires a solution.

Figure 2:
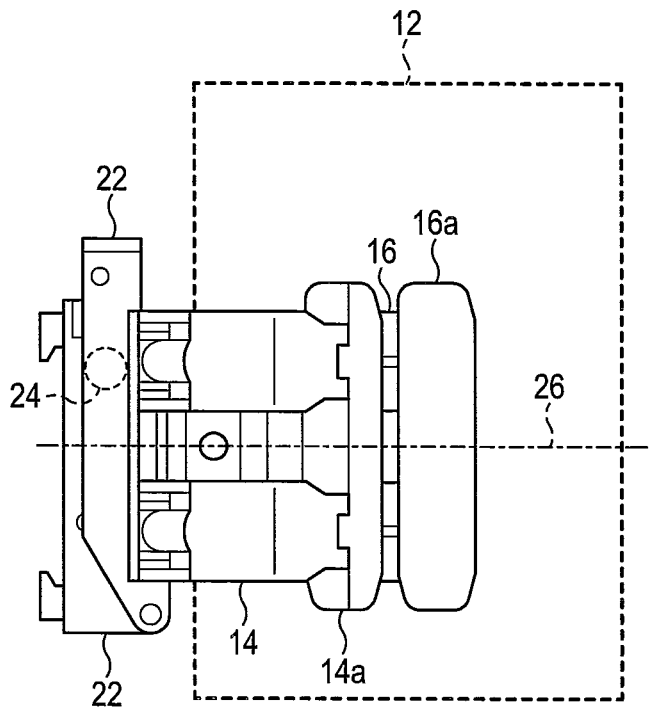
Figure 3:
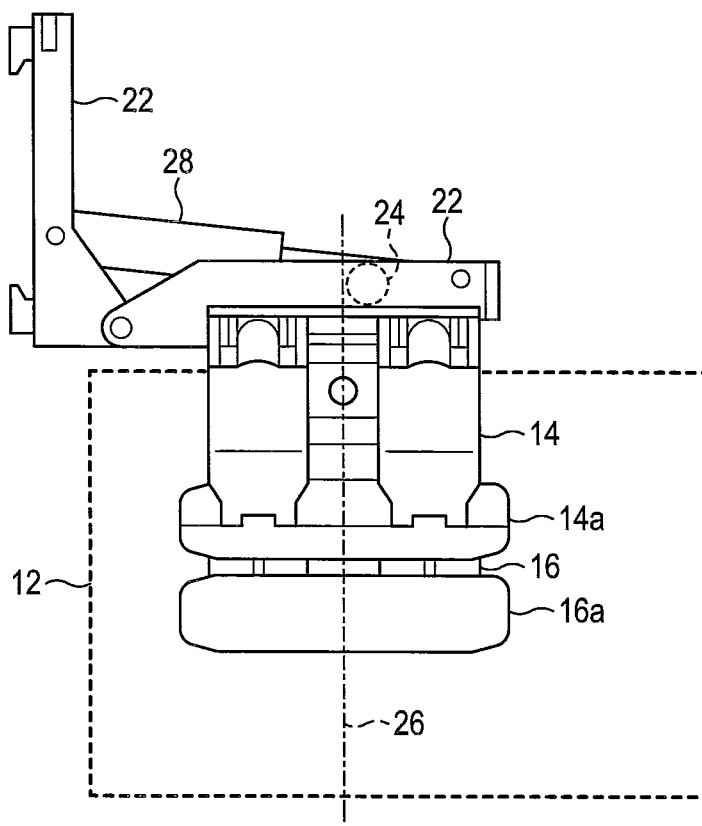
Figure 4:
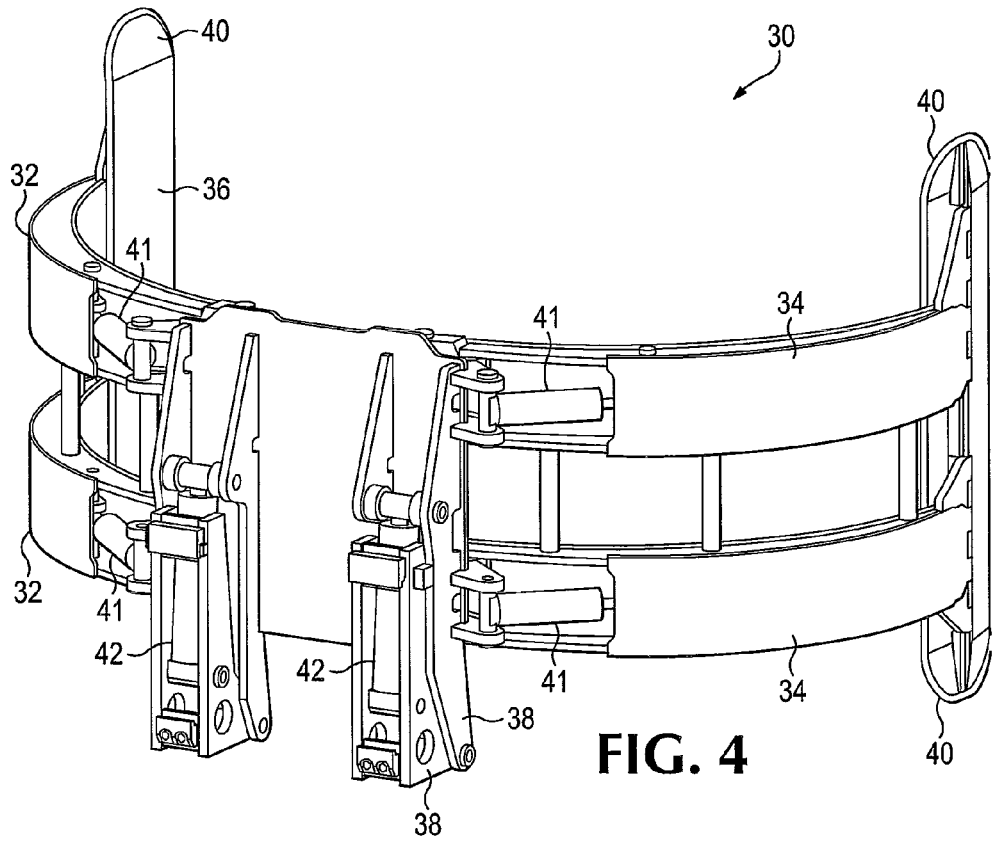
FIG. 4 is a perspective rear view of an example of a tissue roll clamp in accordance with the present invention.
Figure 8:
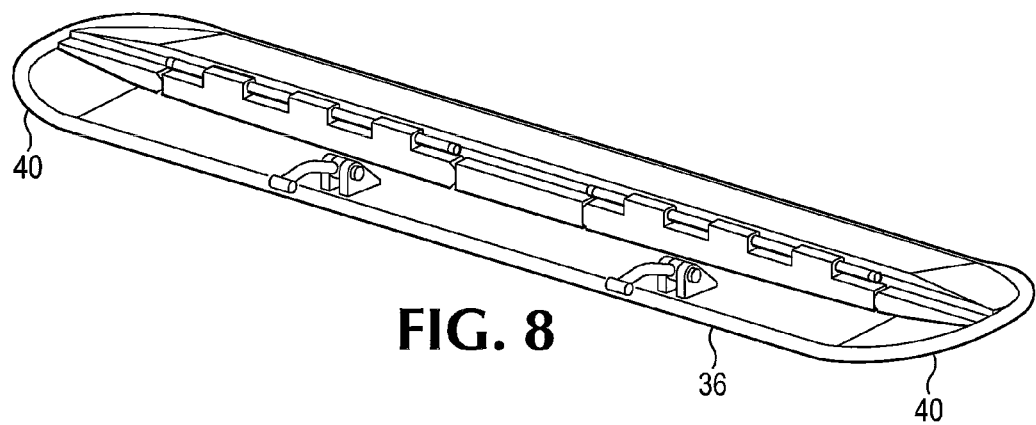
FIG. 8 is a detailed perspective view of an exemplary tissue-engagement clamping pad usable on the tissue roll clamp of FIG. 4.
Figure 9:
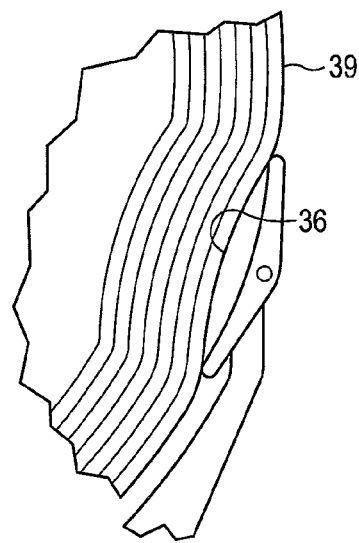
FIG. 9 is a schematic view of the clamping pad of FIG. 8 engaging a tissue roll.
Figure 10:
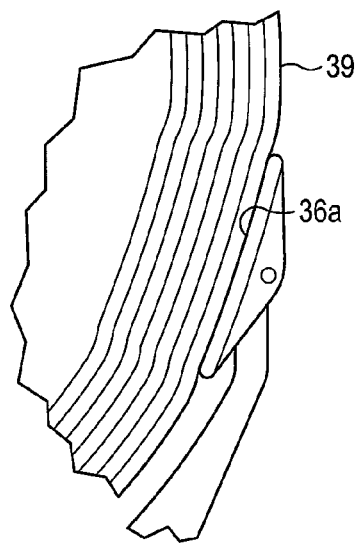
FIG. 10 is a schematic view of an alternative tissue-engagement clamping pad, usable on the exemplary clamp of FIG. 4, engaging a tissue roll.

In its broadest sense, the solution is to arrange the geometry of the clamp so that the respective clamping surfaces are at equal elevations relative to each other regardless of their changeable orientations exemplified by FIGS. 1-3. The applicant has determined that this can be accomplished with maximum effectiveness by utilizing equal-arm arrangements, in contrast to the previous unequal-arm arrangements, for handling tissue rolls in both the horizontal "bilge" position and vertically, without incurring substantial tissue roll damage. For example, this can be accomplished by a clamp 30 as shown in FIG. 4 having equal-length exceptionally slim clamp arms 32, 34 with the above-described convexly curved tissue-engagement clamping surfaces 36 shown in FIGS. 8 and 9 or, alternatively, with shallow concavely curved tissue-engagement clamping surfaces 36a having less curvature than the surface of the roll as shown in FIG. 10. Either of these types of clamping surfaces beneficially deform the outer surface of a tissue roll such as 39 gradually, rather than abruptly, over at least a major portion of the clamping surface area during clamping engagement thereby reducing potentially damaging pressure concentrations. Additionally, or alternatively, clamping surfaces having peripheral clamping areas which recede gradually outwardly and backwardly from a major portion of the clamping surface area, as exemplified by the peripheral clamping areas 40 shown in FIGS. 4 and 8, likewise beneficially deform the outer surface of the roll gradually to reduce such pressure concentrations.

Figure 5:
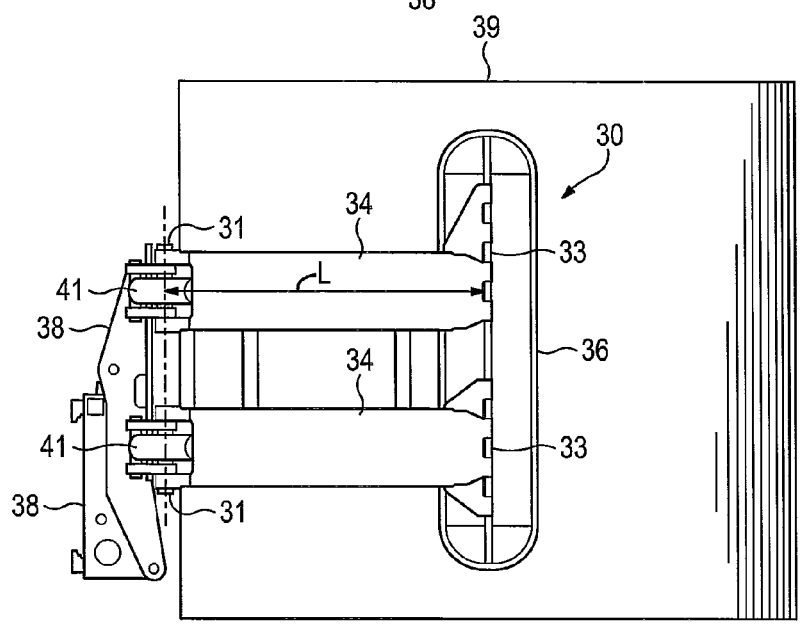
FIGS. 5-7 are side views of the exemplary clamp of FIG. 4 in different operational positions.
Figure 6:
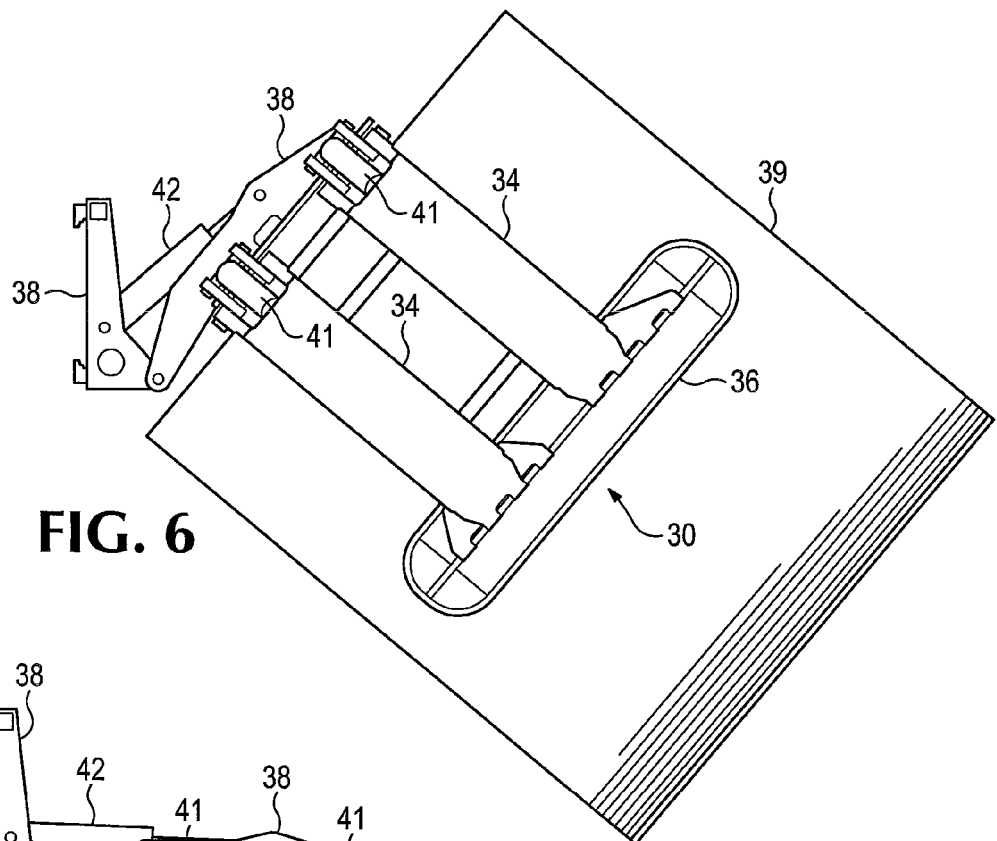
Figure 7:
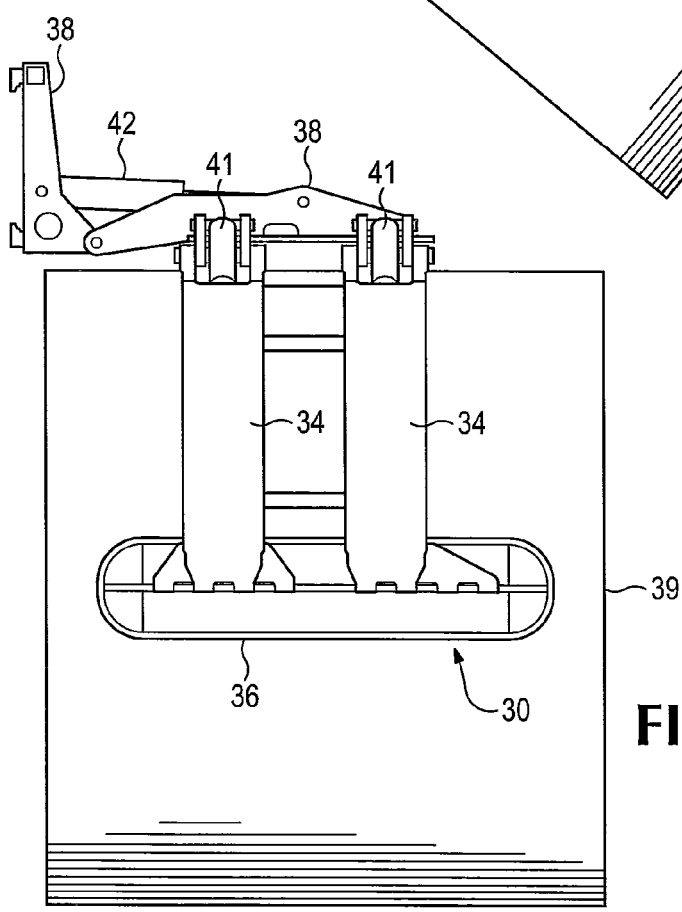

As shown in FIG. 5, the exemplary clamp 30 has a frame assembly 38 for pivotally supporting respective proximal ends of the pair of clamp arms 32, 34 which have substantially equal lengths L extending between respective proximal pivot pins 31 (or alternatively lateral hydraulic sliding members not shown) and respective distal pivot pins 33 to which respective ones of the clamping surfaces 36 are connected. The clamp arms are selectively closable and openable relative to each other by hydraulic cylinders such as 41 to engage and release the tissue roll 39. The clamp arms are also capable of movement in unison by the frame assembly 38, through the extension or retraction of a pair of upender hydraulic cylinders 42, to alternative positions of equal elevations as shown in FIG. 5 and FIG. 7 respectively, where the clamp arms 32, 34 extend longitudinally from the frame assembly 38 selectively in either substantially horizontal (FIG. 5) or substantially vertical (FIG. 7) directions of extension. The frame assembly 38 is capable of maintaining the respective clamping surfaces 36 at substantially equal elevations to each other during such movement, as shown by an exemplary intermediate position in FIG. 6. This enables the clamping surfaces 36 to share the weight of the tissue roll 39 equally regardless of the foregoing changing orientation of the clamp arms, thereby avoiding the above-described transient tissue roll damage from unequal elevations of the clamping surfaces.

The foregoing equal-arm solution eliminates the much-used short arm of previous unequal-arm tissue roll clamps. However the ability of the clamp 30 to engage and release tissue rolls in the horizontal "bilge" position is nevertheless retained by the substituted improved ability of the equal-length arms to engage a horizontal tissue roll 39 from above as shown in FIG. 7 without damaging the roll 39 or closely adjacent tissue rolls, due to the exceptional thinness of the clamp arms 32 and 34 which are surprisingly damage-free in their insertion and retraction between closely adjacent tissue rolls. Moreover the foregoing equal-arm solution eliminates the previously-described problem of trying to use the same clamp to clamp both large-diameter and small-diameter rolls.

As an additional substantial benefit, the need for the previous rotator assembly 24 required in previous unequal-arm clamps can be eliminated in the present equal-arm clamp because the previous objective, of using the rotator to move the clamp arms to unequal elevations as shown in FIG. 1 to engage rolls in the horizontal "bilge" position, is eliminated in the present clamp to prevent potentially damaging unequal weight distribution between the clamping surfaces as explained previously. Thus the substantial load capacity-reducing weight and space requirements of the rotator assembly, as well as its substantial additional cost, are rendered unnecessary in the preferred embodiment of the present clamp. However, if desired, the rotator assembly 24 previously described with respect to FIGS. 1-3 could be optionally included in the present clamp to perform minor angular adjustments of the clamp arms 32 and 34 to aid damage-free insertion and withdrawal of the clamp arms between closely adjacent tissue rolls.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A tissue roll-handling clamp mountable on a vehicle, said clamp having opposed tissue-engagement clamping surfaces capable of selectively clamping outwardly curved surfaces of a tissue roll, said clamp including a frame assembly for movably supporting respective proximal ends of a pair of selectively openable and closable elongate opposing clamp arms having respective distal ends to which respective ones of said clamping surfaces are connected, said clamp arms being supported by said frame assembly at said respective proximal ends of said clamp arms and connected with said frame assembly by respective opposed hydraulic cylinders so as to enable relative movement of said clamp arms with respect to each other by said hydraulic cylinders, said clamp arms being capable of movement in unison by said frame assembly to alternative positions where said clamp arms extend longitudinally from said frame assembly selectively in either substantially horizontal or substantially downwardly vertical directions of extension, respectively, said frame assembly being capable of maintaining said respective clamping surfaces at substantially equal elevations continuously throughout said movement of said clamp arms from one of said directions of extension to the other, said frame assembly being incapable of causing said respective clamping surfaces to be at substantially unequal elevations.

2. The clamp of claim 1 wherein each of said opposed tissue-engagement clamping surfaces has a gradually curved surface extending substantially continuously throughout at least a major portion of the respective clamping surface.

3. The clamp of claim 1 wherein each of said opposed tissue-engagement clamping surfaces has a respective substantially protrusion-free peripheral portion shaped so as to recede in a direction away from the opposing clamping surface.

4. A method of handling a tissue roll, having a tissue density no greater than about 0.015 pounds per cubic inch, by means of a vehicle-mounted roll-handling clamp, said method comprising:
   (a) providing said clamp with opposed tissue-engagement clamping surfaces capable of selectively clamping outwardly curved surfaces of said tissue roll, said clamp including and a frame assembly for movably supporting respective proximal ends of a pair of selectively openable and closable elongate clamp arms having respective distal ends to which respective ones of said clamping surfaces are connected, said clamp arms being supported by said frame assembly at said respective proximal ends of said clamp arms and connected with said frame assembly by respective opposed hydraulic cylinders so as to enable relative movement of said clamp arms with respect to each other by said hydraulic cylinders;
   (b) clamping opposite sides of said tissue roll between said clamping surfaces; and
   (c) moving said clamp arms in unison by means of said frame assembly while clamping said tissue roll, so as to cause both of said clamp arms to move selectively either to substantially horizontal or to substantially downwardly vertical directions of extension, respectively, relative to said frame assembly while maintaining said respective clamping surfaces at substantially equal elevations continuously throughout said moving of said clamp arms from one of said directions of extension to the other; and
   (d) preventing said respective clamping surfaces from being at substantially unequal elevations while clamping said tissue roll.

5. The method of claim 4, including clamping said tissue roll between said opposed tissue-engagement clamping surfaces, each respective clamping surface having a gradually curved surface extending substantially continuously throughout at least a major portion of the respective clamping surface.

6. The method of claim 4, including clamping said tissue roll between said opposed tissue-engagement clamping surfaces having respective substantially protrusion-free opposed peripheral portions shaped so as to recede in a direction away from said tissue roll.

\* \* \* \* \*